Figure 1:
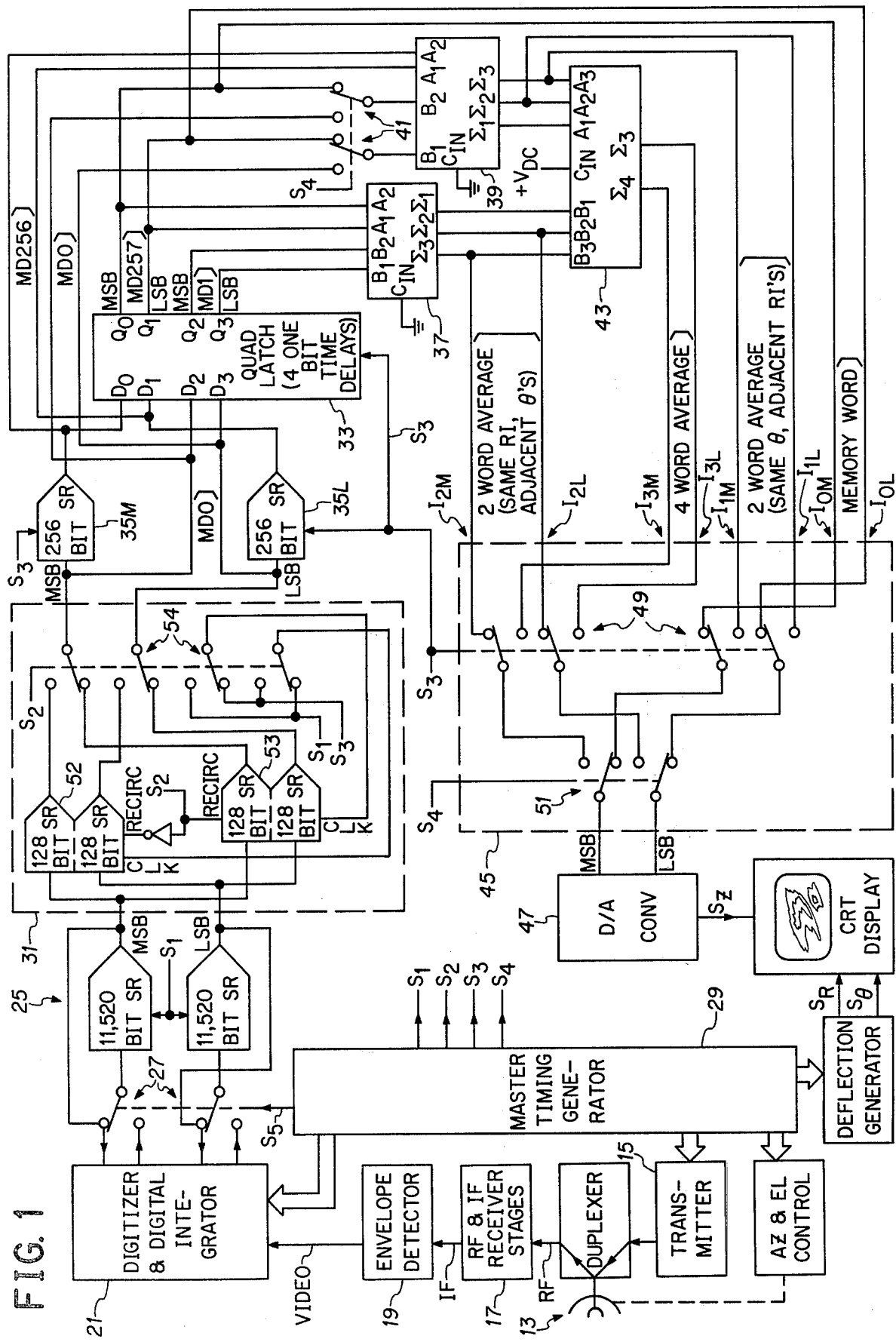

United States Patent [19]

Hooker, Jr.

[11] 4,137,530

[45] Jan. 30, 1979

[54] DIGITAL RADAR DISPLAY SMOOTHING

[75] Inventor: Marvin L. Hooker, Jr., Marion, Iowa

[73] Assignee: Rockwell International Corporation, El Segundo, Calif.

[21] Appl. No.: 809,954

[22] Filed: Jun. 27, 1977

[51] Int. Cl.² ............................................. G01S 7/10
[52] U.S. Cl. .................................. 343/5 VQ; 340/723; 340/798
[58] Field of Search ............... 343/5 VQ; 340/324 AD

[56] References Cited

U.S. PATENT DOCUMENTS

| | | | |
|---|---|---|---|
| 2,939,129 | 5/1960 | Atlas et al. | 343/5 W |
| 3,573,789 | 4/1971 | Sharp | 340/324 AD |
| 3,688,033 | 8/1972 | Hell et al. | 178/15 |
| 3,789,386 | 1/1974 | Itoh | 340/324 AD |
| 3,878,536 | 4/1975 | Gilliam | 340/324 AD |
| 3,921,164 | 11/1975 | Anderson | 340/324 AD |
| 3,969,716 | 7/1976 | Roberts | 340/324 AD |
| 4,023,165 | 5/1977 | Holt et al. | 343/5 VQ X |
| 4,040,052 | 8/1977 | Stanislaw | 343/5 VQ |
| 4,044,352 | 8/1977 | Wilmot | 343/5 VQ |

FOREIGN PATENT DOCUMENTS 953010  8/1974  Canada .................................. 343/5 VQ

*Primary Examiner*—Malcolm F. Hubler
*Attorney, Agent, or Firm*—Terry M. Blackwood; H. Fredrick Hamann; L. Lee Humphries

[57] ABSTRACT

A digital radar including (i) a digital memory whose stored array of digital words represents radar searched space and (ii) display smoothing apparatus receiving the memory data and quadrupling the number of digital words available for display. Typical of the preferred embodiment, a four digital word group comprising $W_a$, $W_b$, $W_c$, and $W_d$, and representing four mutually contiguous searched space segments is used to produce the average of $W_a$ and $W_b$, the average of $W_a$ and $W_c$, and the average of all four in the group. The averages and the memory words are painted on a display in their appropriate locations.

5 Claims, 8 Drawing Figures

DIGITAL RADAR DISPLAY SMOOTHING

This invention relates to digital radar and more particularly to smoothing of digital radar displays.

Digital radars employ a digital memory and conventional CRT (cathode ray tube) to replace the widely used electrostatic memory tube of radar display device. For reasons of economy, size, or power, the display memory is generally made small relative to the radar searched space. For instance, typical memory capacity values are 128 two-parallel-bit words per line of memory and a memory line for each degree of azimuth. Each word of course represents an independent sample of a different segment of the radar searched space. To avoid gaps in a reasonable size display and achieve two display lines per degree of azimuth, the display is filled in by painting each memory line twice, the second painting of a memory line being located on the display 0.5° from the first painting of the same memory line. Although this technique has many advantages over increasing the number of words per memory lines and/or memory lines per degree of azimuth, the display quality or resolution is coarse, blocky, or square, and several of the fine details are lost. Another objectional feature of this technique is that noise hits are presented on the display as twice, or sometimes three times, their actual size.

Also employed in the prior art is a technique in which variations in the memory data are smoothed out by forcing certain memory words to take on adjoining word values. Modifying the memory content in such manner can mask or obliterate certain information, such as storm gradient information, from the display.

Figure 2B:
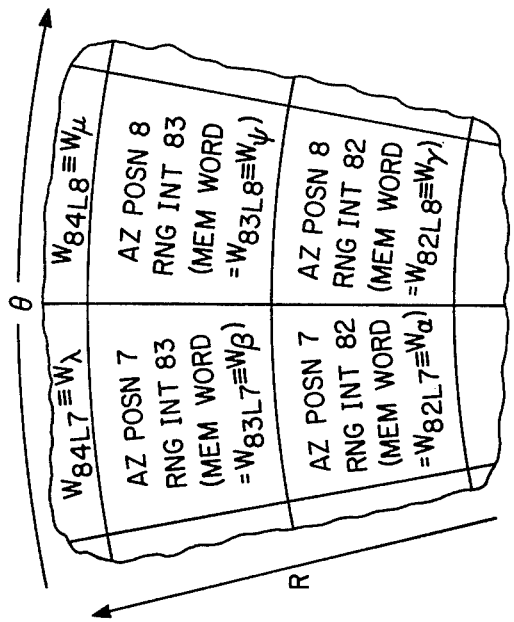
Figure 2A:
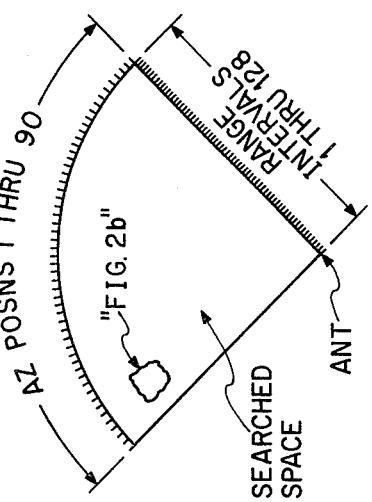
Figure 3C:
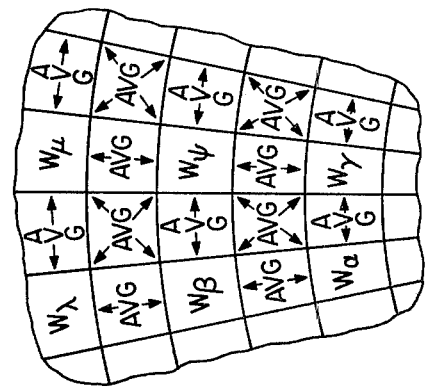
Figure 3B:
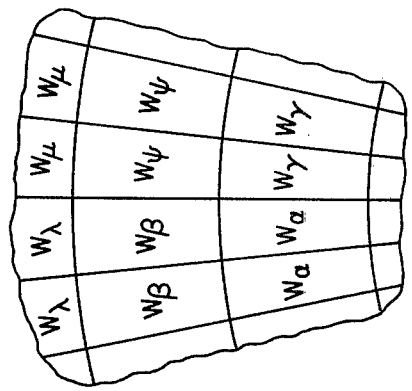
Figure 3A:
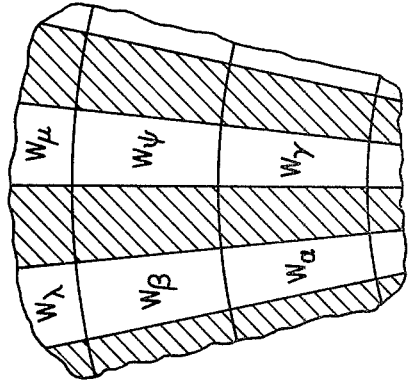
Figure 4:
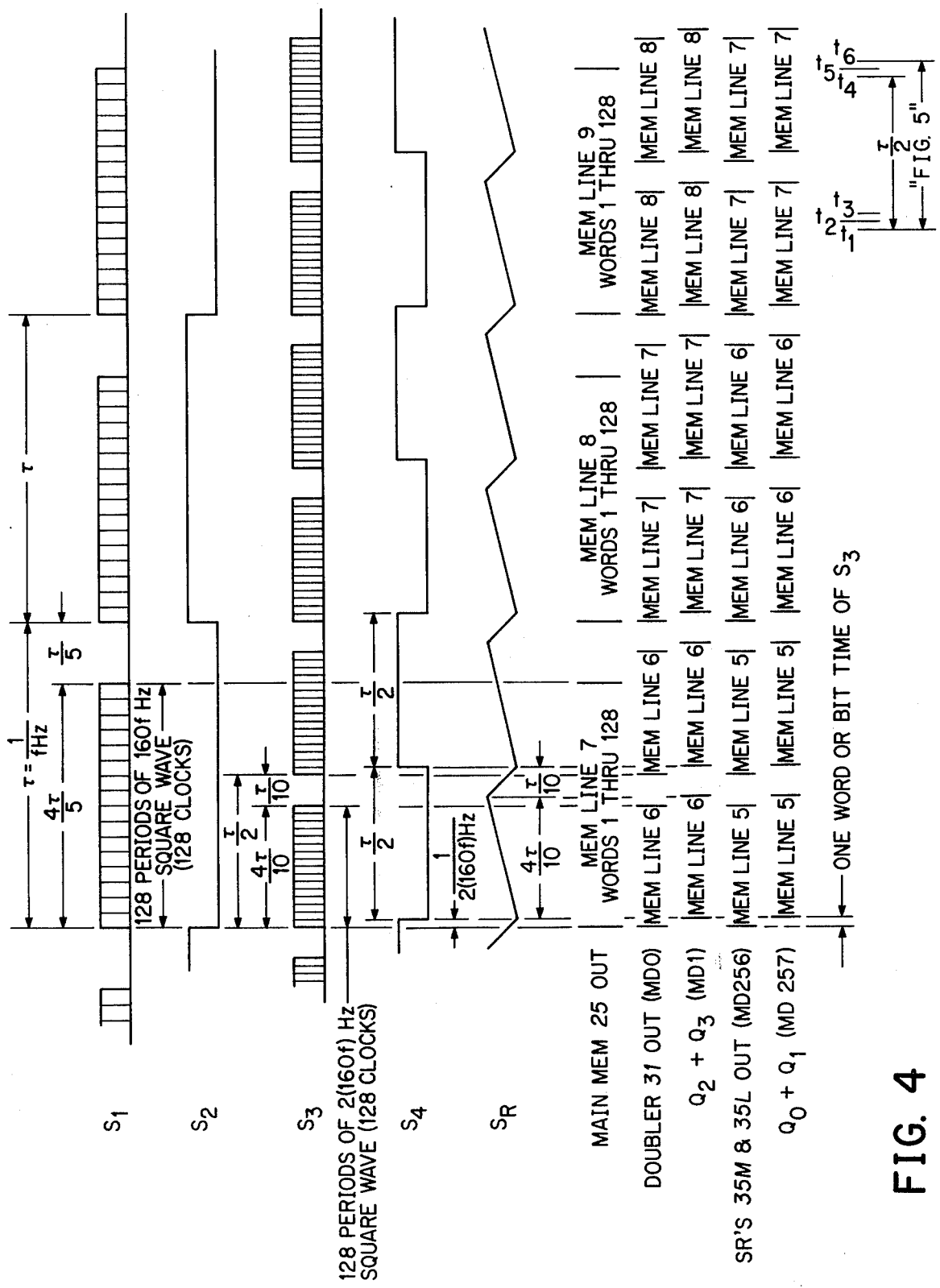
Figure 5:
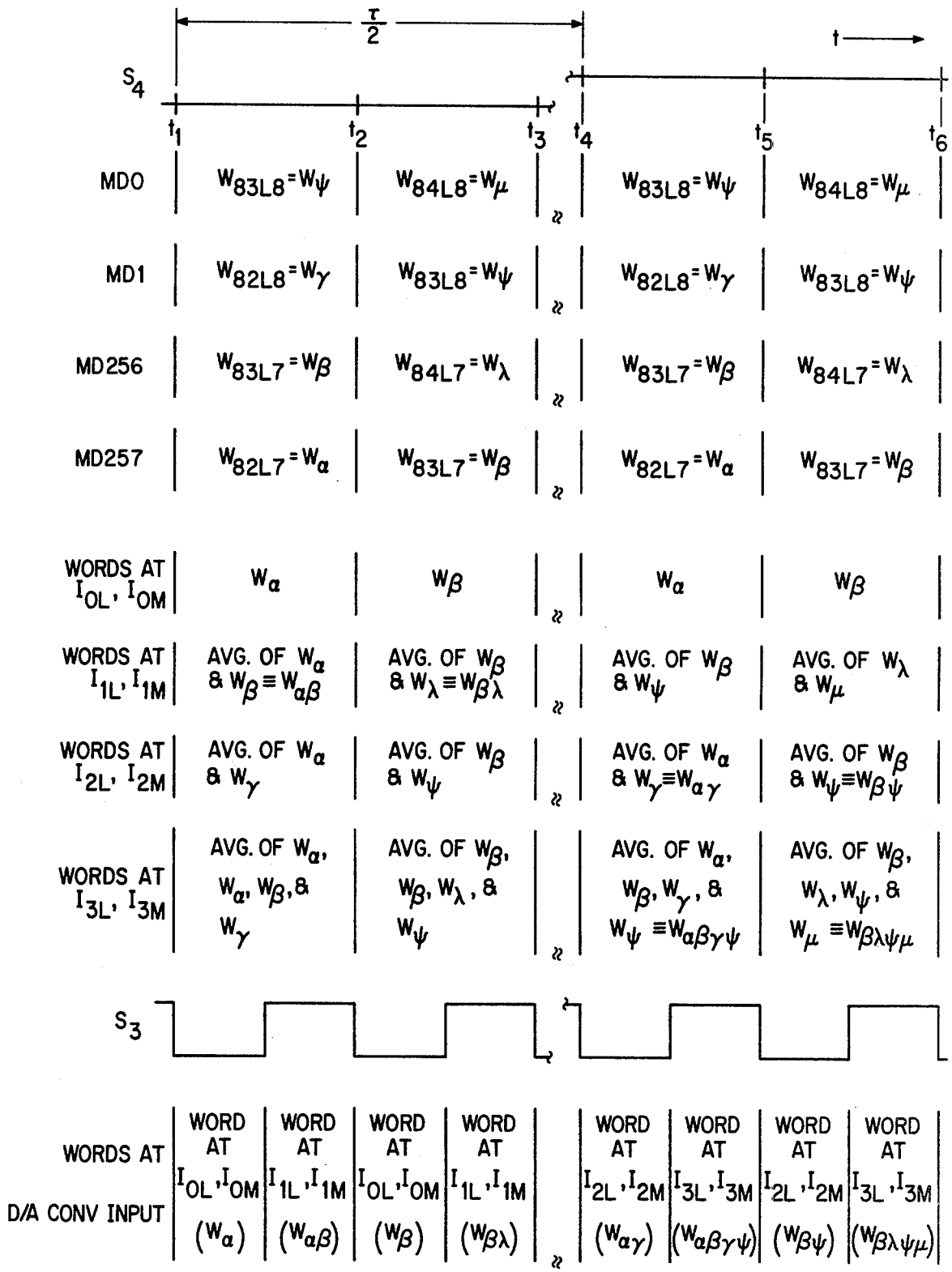

In accordance with the present invention there is featured the provision of improved display resolution and display smoothing. The preferred display is effectively equivalent to one attainable by quadrupling the memory, yet the memory size is not increased. Moreover the data stored in memory is not modified by the smoothing. These and other features, objects, and advantages of the invention will become more apparent upon reference to the following specification, claims, and appended drawings in which:

FIG. 1 is a block functional diagram showing the presently preferred inventive embodiment, FIGS. 2a and 2b represent the radar searched space and a portion thereof, FIGS. 3a, 3b, and 3c represent a portion of a PPI display each showing a different painting thereon of digital words, and FIGS. 4 and 5 show waveforms and data flow diagrams useful in explaining the operation of the FIG. 1 apparatus.

In the system illustrated in FIG. 1, antenna 13 is presently caused to scan 90° in azimuth substantially in 90 regularly occurring one-degree increments, the rate of incrementing being approximately 24Hz. For each one-degree antenna increment or azimuth position there are four regularly occurring pulse periods. During any one pulse period, transmitter 15 is caused to emit a radar pulse, and following the transmission the radar return therefrom is processed at RF and IF in 17 and then amplitude detected in 19. The resultant video is then processed in item 21 as follows.

Briefly, in item 21, each of the four video returns is digitized, the four are then accumulated or summed together, and this accumulation further summed with digital data representative of the line of memory which corresponds to the same antenna position but which was derived and stored in memory 25 during the next preceding antenna scan. A new line of digital data representative of the total sum is entered in memory 25 at the address corresponding to this azimuth position. That is, the total sum becomes a new line of memory data and replaces the old line of memory data for this azimuth position.

More particularly, each of the four returns from a particular azimuth position are in turn digitized at a predetermined bit rate into 128 serially occuring two-parallel-bit digital words. The time interval per bit corresponds of course to one range resolution interval, and 128 bit time intervals correspond to the maximum radar range. These four digitized returns are summed such that the resultant word for any particular bit time comprises the sum of the four digital words for that particular bit time. The resultant is of course 128 serially occurring digital words. To this sum is also added 128 words representative of the line of data stored in memory 25 which corresponds to the same antenna position but which was derived during the next preceding antenna scan. At a time compatible with similar processing for the next antenna position, switch 27, as controlled by $S_5$, permits a line of data representative of this total sum and comprising 128 two-parallel-bit digital words to be entered into memory 25 as the new line of memory data for this particular azimuth position, replacing the old line of data therein.

At any particular point in time, memory 25, which comprises two 11,520 bit shift registers operating in parallel, contains 90 different lines of data which correspond respectively to the 90 different antenna azimuth positions, and any particular line comprises 128 two-parallel-bit digital words which correspond respectively to the 128 different range intervals. That is, and as seen from FIGS. 2a and 2b, each of 11,520 different segments of the searched space is represented by a digital word in memory. For instance, as indicated in FIG. 2b, the 82nd word of memory line 7 (i.e., $W_{82L7}$) represents and corresponds to a segment of searched space located at the 82nd range interval along the 7th azimuth position.

Items 21 and 25 of FIG. 1 comprise the subject of U.S. patent application Ser. No. 720,165, now U.S. Pat. No. 4,088,996, entitled "Radar Signal Processor" and assigned to the assignee of the present invention. Timing coordination for transmitting, antenna incrementing, digital processing, and CRT deflection is provided by master timing generator 29. For additional detail on items 21, 25, and 29, the system portions preceding same, the timing coordination and other such background of the present invention, said application is hereby incorporated by reference into the present disclosure. Moreover, it should be recognized by those skilled in the art that said items, although presently preferred, are merely exemplary, and not limiting, of the type of system components with which the present inventive contribution may be employed.

Turning now to FIGS. 3a, 3b, and 3c, each said figure represents a small portion of a PPI display screen and each represents a different painting on the screen of memory data corresponding to the FIG. 2b portion of searched space. FIG. 3a illustrates the earlier mentioned problem in painting the memory data on the display screen with no attempt to fill in the display. That is, due to the small spot size created by the CRT beam, a reasonable size display would contain gaps between painted lines of memory information. FIG. 3b illustrates the earlier mentioned typical approach to solving this problem. Namely, each memory word is painted twice per degree of display, the second painting being shifted from the first painting by ¼° on the display itself and merely repeating the intelligence delivered by the first painting.

FIG. 3c represents the display accomplished by the preferred inventive embodiment herein. That is, in addition to painting each word in memory in its correct location on the display screen, certain averages of memory words representing contiguous searched space segments are also painted on the screen in appropriate locations. More particularly, as seen from FIG. 3c, images for memory words such as $W_\alpha$, $W_\beta$, $W_\gamma$, and $W_\psi$, etc., are painted at screen locations representative of their relative searched spaced locations but each said memory word occupies only about one-fourth the screen real estate occupied by the same word in FIG. 3b. Between images of adjacent, same-memory-line memory words there is painted an average of these memory words. For instance, between the $W_\alpha$ and $W_\beta$ images there is painted the average of these two words. Also, between images of adjacent, same-range-interval memory words, an average representative of these two words is painted. For instance, between the $W_\alpha$ and $W_\gamma$ images there is painted the average of $W_\alpha$ and $W_\gamma$. Substantially centrally of the images corresponding to four mutually contiguous segments of space, an image is painted which corresponds to the average of the four corresponding memory words. For instance, an image representative of the average of words $W_\alpha$, $W_\beta$, $W_\gamma$, and $W_\psi$, is painted substantially centrally of the images corresponding to these four words.

Returning now to FIG. 1 to describe the preferred apparatus by which the display of FIG. 3c is achieved, the rate at which memory data exits main memory 25 is first doubled by doubler 31. The doubler 31 memory data output MDO is then delayed one word or bit time by two of the latches in quad latch 33, 256 word times by shift registers 35M and 35L, and 257 word times by the combined effect of shift registers 35M and 35L and the second half of quad latch 33. These memory data outputs delayed from MDO are designated respectively MD1, MD256, and MD257. MD1 and MD257 are summed in binary adder 37. MD256 is summed in binary adder 39 with either MD257 or MDO, depending on the state of switch 41 at adder 39 inputs $B_1$ and $B_2$. The outputs of adders 37, 39, and a binary 1 are summed in binary adder 43. Each of adders 37, 39, and 43 comprise a full adder which operates according to the following:

, $\Sigma_1 = A_1 + B_1 + C_{in}$

, $\Sigma_2 = A_2 + B_2 + \text{first carry}$

, $\Sigma_3 = A_3 + B_3 + \text{second carry}$

, $\Sigma_4 = \text{third carry}$

In adders 37 and 39, $C_{in}$, $A_3$, and $B_3$ are always 0.
In adder 43, $C_{in}$ is always 1.

At its four input pairs $I_0$, $I_1$, $I_2$, and $I_3$, multiplexer 45 receives respectively (i) MD257, (ii) the two most significant bits ($\Sigma_3$ and $\Sigma_2$) from adder 37, (iii) the two most significant bits ($\Sigma_3$ and $\Sigma_2$) from adder 39, and (iv) the two most significant bits ($\Sigma_4$ and $\Sigma_3$) from adder 43. Multiplexer 45 delivers to the D/A converter 47 one of the four multiplexer inputs, the particular one delivered depending on the state of switches 49 and 51. The output $S_z$ of D/A converter 47 is then used to intensity modulate the CRT beam in accordance with the weight of the digital words out of multiplexer 45.

For a more detailed description of the FIG. 1 apparatus and its operation, reference to aiding FIGS. 4 and 5 will now be made. The effect of doubler 31 as earlier mentioned is to make each main memory line appear twice at the doubler output for every single appearance at the doubler input. More particularly, a gated clock signal $S_1$ during a time interval $\tau$ when $S_2$ is high, serially loads one line of main memory 25, (e.g., memory line 8) into dual 128 bit shift register 52. ($\tau = 1/\text{fHz}$ and fHz is typically 45×96Hz.) Meanwhile, a second gated clock $S_3$, which is twice the frequency of $S_1$, causes the previous 128 words in dual 128 bit shift register 53 (e.g., line 7) to serially circulate therein twice. (When either of shift registers 52 or 53 is in its recirculate mode, its input is internally disconnected from the main memory 25 and the 128 words of data in 52 or 53 is internally circulated from output to input.) While $S_1$ is clocking the memory data into shift register 52, $S_3$ is clocking the data out of shift register 53 at twice the rate, i.e., data doubling. Switch 54 connects this higher rate data to the inputs of shift registers 35M and 35L. At the end of this $\tau$ period the control signal $S_2$ goes low and the data that was loaded into shift register 52 is now read out twice while the next line of data from memory is read into shift register 53. That is, during the next $\tau$ interval, memory line 9 appears once at the doubler input and memory line 8 appears twice in succession at the doubler output. And so on.

As above mentioned, the two-parallel-channel memory data exiting doubler 31 is herein designated MDO. MD1 is the memory data MDO delayed by one bit time of the $S_3$ waveform, the one bit time delay being provided by one-half of quad latch 33. MD256 is the memory data MDO delayed by 256 bit times of the $S_3$ waveform, the 256 bit time delay being provided by shift registers 35M and 35L. MD257 is the memory data MDO delayed by 257 bit times of the $S_3$ waveform, the 257 bit time delay being provided by the combined effect of shift register 35M and 35L, and the second half of quad latch 33. The time relationship between main memory data out, doubler output MDO, MD1, MD256, and MD257 is graphically illustrated by example at the bottom of FIG. 4.

Adder 39 receives and adds MD256 and MD257 when $S_4$ is low. When $S_4$ is high, switch 41 changes to the position opposite that illustrated and adder 39 adds MD256 and MDO. Also, when $S_4$ is low, switch 51 of multiplexer 45 is in the position illustrated in FIG. 1 and the multiplexer output is either multiplexer input pair $I_0$ or input pair $I_1$. When $S_4$ is high, switch 51 of multiplexer 45 is in the position opposite that illustrated in FIG. 1 and the multiplexer output is either multiplexer input pair $I_2$ or input pair $I_3$. During the first half of any one word or bit time of the $S_3$ waveform, $S_3$ causes switch 49 to be in the position illustrated in FIG. 1, and during the second half of this bit time $S_3$ causes switch 49 to be in the position opposite to that illustrated. $S_r$ illustrates the CRT beam deflection with range. That is, one outward beam trace is completed for each complete memory line appearance in MD257. During the retrace portion of $S_r$, video blanking (not shown) is effectuated. $S_\theta$ (not shown in FIG. 4) increases for each memory line appearance in MD257 so that display $\theta$ change is effectuated.

Using only the $\Sigma_3$ and $\Sigma_2$ outputs on adders 37 and 39 has the effect of adding the two input words together, dividing their sum by two, and rounding this quotient to the nearest integer. (For the illustrated embodiment, quotients containing $\frac{1}{2}$ are rounded downward.) That is, a $\Sigma_3\Sigma_2$ output word of either adder 37 or 39 is substantially the average of the two simultaneously occurring input words. For instance, assuming that at a particular word time the most significant bit (MSB) of MD257 is 1, the least significant bit (LSB) of MD257 is 1, the MSB and LSB of MD1 are respectively 1 and 0, the adder 37 $\Sigma_3$ output will be 1 and $\Sigma_2$ will be 0. Using decimal equivalents, inputs of 3 (i.e., 1 1) and 2 (i.e., 1 0) to adder 37 yield an output of 2 (i.e., 1 0), the least significant output bit (i.e., $\frac{1}{2}$) having been dropped.

With the adder 43 receiving adders 37 and 39 outputs, and a "1" at $C_{in}$, using only adder 43 $\Sigma_4$ and $\Sigma_3$ outputs has the effect of adding four words together, dividing this sum by 4 and rounding the resultant quotient to the nearest integer. (Adding the 1 at $C_{in}$ assures upward rounding of quotients containing three-fourths yet maintains downward rounding of quotients containing one-half and one-fourth.) Thus, a $\Sigma_4\Sigma_3$ output work of adder 43 is substantially the average of four predetermined memory data words.

Turning now to FIG. 5, therein is shown a magnified version of the $t_1$ to $t_6$ time interval of FIG. 4. During the $t_1$ to $t_2$ word time interval, the MD0 word is $W_\psi$, the MD1 word is $W_\gamma$, the MD256 word is $W_\beta$, and the MD257 word is $W_\alpha$. Each of these words, as shown in FIG. 2b, represents a specific segment of the searched space and more particularly, these four words represent four mutually contiguous segments of the searched space. Since MD0 is tied directly to the multiplexer 45 $I_0$ input pair, the $I_0$ input word during this word time interval is $W_\alpha$. Since $S_4$ is low and switch 41 is in the FIG. 1 illustrated position during this word time interval, the $I_1$ input word comprises the average of the MD256 word and the MD257 word, namely the average $W_{\alpha\beta}$ of words $W_\alpha$ and $W_\beta$. Since $S_4$ is low and switch 51 is in the FIG. 1 illustrated position during this time, it is inconsequential what words appear at multiplexer inputs $I_2$ and $I_3$. (These words are, however, shown in FIG. 5.) During the first half of this time interval, $S_3$ is low and the multiplexer 45 output word is $W_\alpha$. During the second half of this time interval, $S_3$ is high and the multiplexer output word is the average indicative word $W_{\alpha\beta}$.

In a similar manner, during the first half of the next word time interval $t_2$ to $t_3$, $S_3$ is again low and the multiplexer output word is $W_\beta$. During the second half of this $t_2$ to $t_3$ time interval, $S_3$ is again high and the multiplexer output word is the average indicative word $W_{\beta\lambda}$. Images representative of words $W_\alpha$, $W_{\alpha\beta}$, $W_\beta$, $W_{\beta\lambda}$, $W_\lambda$, etc., are thus painted in succession in the recited order as shown in FIG. 3c along the same scope trace, the $W_{\alpha\beta}$ image appearing between the $W_\alpha$ and $W_\beta$ images, the $W_{\beta\lambda}$ image appearing between the $W_\beta$ and $W_\lambda$ images, and so on.

During the $t_4$ to $t_5$ word interval, it is seen that the words of MD0, MD1, MD256 and MD257 are the same as during the $t_1$ to $t_2$ time interval above described. During this $t_4$ to $t_5$ time interval, however, $S_4$ is high and thus the switch 41 at the input of adder 39 and switch 51 of multiplexer 45 assume the positions opposite to that illustrated in FIG. 1. Thus, during this time interval adder 39 sums MD256 and MD0, and only the words appearing at multiplexer input pairs $I_2$ and $I_3$ are of consequence. The $I_2$ input word during this $t_4$ to $t_5$ word time interval comprises the average of the MD1 word and the MD257 word, namely, the average, $W_{\alpha\gamma}$, of words $W_\alpha$ and $W_\gamma$. The $I_3$ input word during this time interval comprises the average of the MD0 word, the MD1 word, the MD256 word, and the MD257 word, namely, the average, $W_{\alpha\beta\gamma\psi}$, of words $W_\alpha$, $W_\beta$, $W_\gamma$, and $W_\psi$. During the first half of this $t_4$ to $t_5$ time interval, $S_3$ is low and the multiplexer 45 output word is the average indicative word $W_{\alpha\gamma}$. During the second half of this time interval, $S_3$ is high and the multiplexer output word is the average indicative word $W_{\alpha\beta\gamma\psi}$. In a similar manner, during the first half of the next word time interval $t_5$ to $t_6$, $S_3$ is again low and the multiplexer output word is $W_{\beta\psi}$. During the second half of this $t_5$ to $t_6$ time interval, $S_3$ is high and the multiplexer output word is the average indicative word $W_{\beta\psi\lambda\mu}$. Images representative of $W_{\alpha\gamma}$, $W_{\alpha\beta\gamma\psi}$, $W_{\beta\psi}$, etc., are thus painted in succession in the recited order as shown in FIG. 3c along a scope trace shifted approximately one-half degree on the display from the trace containing $W_\alpha$, $W_{\alpha\beta}$, etc., and constitute a "fill" line of display. Following this display "fill" line, the entire process as above-described, is repeated such that the next display line comprises images for $W_\gamma$, $W_{\gamma\psi}$, $W_\psi$, $W_{\psi\mu}$, $W_\mu$, etc., and then another "fill" display line. And so on.

It will be apparent to those skilled in the art that the 128th word of each memory line becomes averaged with the first word in the succeeding memory line, and also that each word in the 90th memory data line becomes averaged with its corresponding range interval memory data word in line 1. Also, the four word averages in the last fill line are subject to a combination of these effects. Due to the nature of typical targets observed however, this feature has shown no potential for interfering with data interpretation. Moreover, these averages along the display extremities could be prevented from causing any possible misinterpretation, or from even being displayed if so desired. For instance, video blanking during these word times might be employed. Or the words themselves during these word times could be forced to a predetermined value such that the display contained a definite border.

It should also be noted that although the main memory data is arranged for R-$\theta$ display scanning, the same principles of smoothing may be applied whether the memory data is arranged for X-Y display scanning or "arc" scanning.

Thus, while a particular embodiment of the present invention has been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a radar system of the type including means for receiving echo signals from targets in a searched space: means for producing, from the received echo signals, an array of digital words representative of the searched space; and digital memory means for storing for a predetermined time at least words $W_a$, $W_b$, $W_c$ and $W_d$ of said array of digital words, said words $W_a$, $W_b$, $W_c$ and $W_d$ corresponding to four mutually contiguous segments of the searched space, the $W_c$ corresponding segment being at the same range as the $W_a$ corresponding segment, the $W_d$ corresponding segment being at the same range as the $W_b$ corresponding segment, and the $W_b$ corresponding segment being at a range different from the $W_a$ corresponding segment, the improvement comprising:

means for producing (i) a digital word $W_{ab}$ which is substantially the average of digital words $W_a$ and $W_b$, (ii) a digital word $W_{ac}$ which is substantially the average of digital words $W_a$ and $W_c$, and (iii) a digital word $W_{abcd}$ which is substantially the average of digital words $W_a$, $W_b$, $W_c$, and $W_d$, and means, including display means, for producing display images corresponding to said words $W_a$, $W_b$, $W_c$, $W_d$, $W_{ab}$, $W_{ac}$, and $W_{abcd}$, and for controlling the location on said display means of the display images corresponding to the stored words and the produced averages such that the image corresponding to the word $W_{ab}$ is displayed between the images corresponding to the words $W_a$ and $W_b$, the image corresponding to the word $W_{ac}$ is displayed between the images corresponding to the words $W_a$ and $W_c$, and the image corresponding to the word $W_{abcd}$ is displayed substantially centrally of the images corresponding to the words $W_a$, $W_b$, $W_c$, and $W_d$.

2. In a radar system of the type including means for receiving echo signals from targets in a searched space; means for producing, from the received echo signals, an array of digital words representative of the searched space; and digital memory means for storing for a predetermined time at least words $W_a$, $W_b$, $W_c$, and $W_d$ of said array of digital words, said words $W_a$, $W_b$, $W_c$, and $W_d$ corresponding to four mutually contiguous segments of the searched space, the $W_c$ corresponding segment being at the same range as the $W_a$ corresponding segment, the $W_d$ corresponding segment being at the same range as the $W_b$ corresponding segment, and the $W_b$ corresponding segment being at a range different from the $W_a$ corresponding segment, the improvement comprising:

means for producing (i) a digital word $W_{ab}$ whose value lies between the values of words $W_a$ and $W_b$, (ii) a digital word $W_{ac}$ whose value lies between the values of words $W_a$ and $W_c$, and (iii) a digitial word $W_{abcd}$ whose value lies between the smallest and largest values of the words $W_a$, $W_b$, $W_c$, and $W_d$, and means, including display means, for producing display images corresponding to said words $W_a$, $W_b$, $W_c$, $W_d$, $W_{ab}$, $W_{ac}$, and $W_{abcd}$, and for controlling the location on said display means of the display images corresponding to said words such that the image corresponding to the word $W_{ab}$ is displayed between the images corresponding to the words $W_a$ and $W_b$, the image corresponding to the word $W_{ac}$ is displayed between the images corresponding to the words $W_a$ and $W_c$, and the image corresponding to the word $W_{abcd}$ is displayed substantially centrally of the images corresponding to the words $W_a$, $W_b$, $W_c$, and $W_d$.

3. In a radar system of the type including means for receiving echo signals from targets in a searched space; means for producing, from the received echo signals, an array of digital words representative of the searched space; and digital memory means for storing for a predetermined time at least words $W_a$, $W_b$, $W_c$, and $W_d$ of said array of digital words, said words $W_a$, $W_b$, $W_c$, and $W_d$ corresponding to four segments of the searched space, the $W_c$ corresponding segment being at the same range as the $W_a$ corresponding segment, the $W_d$ corresponding segment being at the same range as the $W_b$ corresponding segment, and the $W_b$ corresponding segment being at a range different from the $W_a$ corresponding segment, the improvement comprising:

means for producing a digital word $W_{abcd}$ whose value lies between the smallest and largest values of the words $W_a$, $W_b$, $W_c$, and $W_d$, and means, including display means, for producing display images corresponding to said words $W_a$, $W_b$, $W_c$, $W_d$, and $W_{abcd}$, and for controlling the location on said display means of the display images corresponding to said words such that the image corresponding to the word $W_{abcd}$ is displayed substantially centrally of the images corresponding to the words $W_a$, $W_b$, $W_c$, and $W_d$.

4. A radar system as defined in claim 3 wherein said digital word $W_{abcd}$ is substantially the average of said words $W_a$, $W_b$, $W_c$, and $W_d$.

5. A radar system as defined in claim 4 wherein said four segments of the searched space are mutually contiguous segments.

* * * * *